United States Patent
Golobrodsky et al.

(10) Patent No.: US 8,549,089 B2
(45) Date of Patent: Oct. 1, 2013

(54) METHOD FOR SENDING MESSAGES TO A MOBILE TELEPHONE

(75) Inventors: Oleg Golobrodsky, Petah Tikva (IL); Gideon Drori, Sha'arei Tikva (IL); Yitzhak Peterburg, Tal Shahar (IL); Moshe Peterburg, Ramat Hasharon (IL)

(73) Assignee: T-Jat Systems 2006 Ltd., Tel Aviv (IL)

( * ) Notice: Subject to any disclaimer, the term of this patent is extended or adjusted under 35 U.S.C. 154(b) by 1517 days.

(21) Appl. No.: 11/476,195

(22) Filed: Jun. 28, 2006

(65) Prior Publication Data
US 2008/0005299 A1   Jan. 3, 2008

(51) Int. Cl.
*G06F 15/16* (2006.01)

(52) U.S. Cl.
USPC .......................... 709/207; 709/205; 709/217

(58) Field of Classification Search
USPC ................................................ 709/204–207
See application file for complete search history.

(56) References Cited

U.S. PATENT DOCUMENTS

| | | | |
|---|---|---|---|
| 5,889,845 A | 3/1999 | Staples et al. | |
| 6,401,131 B1 | 6/2002 | Haverstock et al. | |
| 6,732,332 B1 | 5/2004 | Borysewicz et al. | |
| 6,745,230 B1 | 6/2004 | Cao et al. | |
| 6,757,365 B1 * | 6/2004 | Bogard | 709/206 |
| 6,865,608 B2 | 3/2005 | Hunter | |
| 7,124,123 B1 * | 10/2006 | Roskind et al. | 709/205 |
| 7,174,006 B2 | 2/2007 | Guedalia et al. | |
| 7,254,220 B1 | 8/2007 | Reding et al. | |
| 8,064,434 B2 | 11/2011 | Golobrodsky et al. | |
| 2002/0083127 A1 | 6/2002 | Agrawal | |
| 2003/0002633 A1 | 1/2003 | Kredo et al. | |
| 2003/0069934 A1 | 4/2003 | Garcia-Martin et al. | |
| 2004/0128310 A1 | 7/2004 | Zmudzinski et al. | |
| 2004/0267942 A1 * | 12/2004 | Maes | 709/228 |
| 2005/0273496 A1 * | 12/2005 | Jean et al. | 709/206 |

(Continued)

FOREIGN PATENT DOCUMENTS

| | | |
|---|---|---|
| DE | 102 37 093 A1 | 2/2003 |
| EP | 1 274 222 A2 | 1/2003 |
| WO | 02/43351 A | 5/2002 |

OTHER PUBLICATIONS

Bergsten, Hans, "Javaserver Pages", 2nd Edition, O'Reilly Media, Inc., Published: Aug. 26, 2002, Accessed: May 11, 2009, URL: http://proquest.safaribooksonline.com/059600317x.*

(Continued)

*Primary Examiner* — Patrice Winder
*Assistant Examiner* — Nam Tran
(74) *Attorney, Agent, or Firm* — Novick, Kim & Lee, PLLC; Harold L. Novick; Jae Youn Kim

(57) ABSTRACT

A method is described for providing a user of a telephone device with a capability to receive an indication that a message has been sent to that user via an Internet-based application, irrespective whether the user is currently actively connected to that application or not. The method comprises the steps of receiving a message addressed to said user at a second server associated with the Internet-based application, forwarding the message towards a first server at which a virtual client entity was previously created to allow conducting a communication session that was held between the user and the Internet-based application, determining whether the user is currently connected to the Internet-based application, storing the message if the user is not currently connected to that Internet application and providing the user with an indication that at least one message addressed to him/her has been stored.

16 Claims, 4 Drawing Sheets

(56) References Cited

U.S. PATENT DOCUMENTS

| | | |
|---|---|---|
| 2006/0014530 A1 | 1/2006 | Denenberg et al. |
| 2006/0031339 A1* | 2/2006 | Peters .................. 709/206 |
| 2006/0075039 A1* | 4/2006 | Narayanaswami et al. ... 709/206 |
| 2006/0168037 A1* | 7/2006 | Audu et al. ............ 709/206 |
| 2008/0086564 A1 | 4/2008 | Putman et al. |
| 2008/0126510 A1 | 5/2008 | Golobrodsky |

OTHER PUBLICATIONS

Bergsten, Hans, "Javaserver Pages", 2nd edition, O'Reilly Media, Published: Aug. 26, 2002, Accessed: May 11, 2009, URL: http://proquest.safaribooksonline.com/059600317x.*

* cited by examiner

METHOD FOR SENDING MESSAGES TO A MOBILE TELEPHONE

FIELD OF THE INVENTION

The present invention relates to telecommunication systems and, in particular, to systems adapted to the provisioning of Internet applications via telephone devices.

BACKGROUND OF THE INVENTION

Several techniques have been developed for connecting to or accessing Internet-based information resources on the World Wide Web (WWW) using conventional graphical user interface (GUI) based Internet browser programs. The availability of any particular Web-site surfing technique depends on where the Internet user finds himself or herself in the Internet browser program at any particular instant of time.

For example, if one is currently at a Web-site (i.e., in a particular HyperText Markup Language (HTML) document), at which there is a highlighted or embedded "link" specifying an Internet address of another Web-site (i.e., another HTML document), then the user can access (i.e., "surf to") this other Web-site by simply "clicking on" or selecting the highlighted URL with his/her "mouse" in a conventional manner.

A typical process to access that information begins once the user has clicked on the link, or manually print the URL of the information resource into the browser program. More recently, with the growth and ever increasing complexity of the WWW, new services have been widely in use, services such as MSN®, I Seek You ("ICQ®"), and the like which require intensive interacting with the users of these services. Typically, in order to provide these services, the provider of the service uses one or more servers, with which the users are being in communication in order to receive the requested service. However, in order to allow this communication, the device used by the user is an end device, such as a personal computer (PC), a laptop, etc. which has an IP address that is used for the exchange of message between the user and the target, via the server(s) of the service provider. After the user has defined the service he/she would like to receive, e.g. by entering the WWW address of that service provider, then the browser program automatically connects the user's client system (i.e., Internet access terminal) to the Internet Server computer supporting the selected Web-site (service provider address).

The following references are brought as examples of the vast prior art that exist in connection with the provisioning of services such as those described above, to computer users.

U.S. Pat. No. 6,401,131 describes a system for enabling access to non-HTML files from a web browser. The user requests a non-HTML file from a database using a web browser, and the web browser transmits the request to a server via a HTTP server and module. The server locates and retrieves the document requested while the module translates the document to a format supported by the web browser. The HTTP server communicates the translated file to the web browser over a network. The web browser then presents the translated file to the user.

U.S. Pat. No. 6,732,332 discloses a system of creating Internet web content. Non-web content is received in a web content creation module, which automatically creates web content from the non-web content. An organizational database is then updated with information comprising web content structure information associated with the created web content, incorporating the web content into the web page.

Together with the development of applications and services for computer users, the functionalities of cellular phones have been rapidly developed and quite a few advanced applications and services are now offered to the cellular telephone users. However, the current cellular telephones, whether they are of the second generation or even of the third generation, have not been adapted to support such services, and although quite a few of their users may be interested in receiving services such as ICQ®, MSN® and other real time applications, still, the users of the currently available cellular devices cannot use these applications. The major reason is that the provider's server(s) that support such an application is adapted to communicate with a computer terminal by exchanging messages therewith. For a number of reasons, for example, as the cellular telephone keyboard has a limited number of keys its user has fewer capabilities to easily engage in real time communications with the application's server(s), this cannot be achieved through the use of cellular devices. One solution to overcome this problem is of course by introducing a full range of new cellular telephone devices. However, in view of the already existing number of devices and are being used and the extra size/weight that might be associated with the insertion of functionalities of a PC/laptop to a cellular telephone, another solution is required.

Another problem associated with the existing devices, is, that the telephone user cannot receive indications of messages that await him/her at the server of the application's service provider. For example, if a message is sent to a mobile telephone user who is a subscriber of the MSN® service, he/she will not receive any indication at his/her telephone device to promote his/her probing the MSN® service in order to receive that message.

SUMMARY OF THE INVENTION

It is an object of the present invention to expand the range of applications that a telephone user may use.

It is yet another object of the invention to provide methods and devices adapted to indicate a telephone user the fact that he/she has some messages awaiting for him/her at the server of the application's service provider.

Other objects of the invention will become apparent as the description of the invention proceeds.

According to an embodiment of the present invention, there is provided a method to allow providing a user of a mobile telephone device with an indication that a message was sent to him/her via an Internet-based application, irrespective of whether that user is currently actively connected to that application or not. The method comprises the steps of:

(i) at a second server associated with the Internet-based application, receiving a message addressed to the user;

(ii) forwarding the message towards a first server at which a virtual client entity was previously created to enable establishing a communication session that was previously held between the user of the mobile telephone device and the Internet-based application;

(iii) determining whether the user is currently actively connected to the Internet-based application;

(iv) storing the message if the user is not currently actively connected to that Internet-based application; and (v) providing the user with an indication that at least one message addressed to him/her has been stored.

According to another embodiment of the invention, the method further comprising carrying out the following steps when a user who had never been registered to that Internet-based application before, wishes to register:

transmitting a message towards the first server by the mobile telephone device, denoting the user's request to be connected to that Internet-based application;

establishing a communication path extending between the mobile telephone device and said second server via said first server;

at the first server, creating a virtual client entity adapted to communicate with the mobile telephone device and with the Internet-based application;

associating a user ID and a password with that user in order to allow him/her to use the Internet-based application in the future; and storing an identification of the user at a database associated with that first server (e.g. the user's ID for that Internet-based application).

As will be appreciated by those skilled in the art, the provider that is in charge of providing services through the first server does not necessarily have to be the same provider operating the second server. In fact, since the first server is preferably designed to allow the user to choose an application from among a number of Internet-based applications, which typically are not maintained by a single service provider, at least some of the providers maintaining these second servers are different from the service provider that maintains the first server.

In accordance with another embodiment of the invention, the method provided further comprising a step of authenticating the user by a service provider associated with said first server.

By yet another embodiment of the invention, the method provided further comprising a step of providing the user with a menu from which he/she may select a requested application prior to carrying out the step of establishing the communication path.

According to still another embodiment of the invention, the method further comprising a step of providing the mobile telephone device with a plurality of WML/JSP/HTML (or in any other applicable format) pages transmitted from the first server.

In accordance with another preferred embodiment of the present invention, when the communication session takes place, the mobile telephone device is provided with an appropriate emulation to allow the user to communicate with the Internet-based application.

In accordance with yet another embodiment of the invention, the method provided further comprising a step of establishing an Internet connection between the mobile telephone device and the first server prior to transmitting message-related indication to the user. Alternatively, the step of providing the user with that indication is carried out following the receipt of a request generated by the user of the mobile telephone device to connect to any Internet-based application via that first server (the above Internet-based application, or another one). By another alternative, the step of providing the user with said indication is carried out following the establishment of a communication session between the mobile telephone device and the Internet-based application. In accordance with yet another alternative of this embodiment of the invention, the step of providing the user with the indication is carried out by sending the indication to the mobile telephone device following the storage of the message at the first server, irrespective whether a request to connect the user with said Internet-based application has been initiated.

By yet another embodiment, the method further comprises a step of establishing an Internet connection between the telephone device and the first server, prior to transmitting the indication, so that the operator associated with the user's mobile telephone device may provide the user with Internet services as if it were an ISP (Internet Service Provider).

According to another aspect of the invention, there is provided a computer program product encoding a computer program stored on a non-transitory computer readable storage medium for executing a set of instructions by a computer system comprising one or more computer processors a process for creating a virtual client entity adapted to communicate with a mobile telephone device and with an Internet-based application associated with a remote server, storing an identification of a user of the mobile telephone device for communicating with the Internet-based application, storing messages forwarded towards a server associated with the computer program product from the remote server, and sending an indication towards the mobile telephone device, indicating that there is/are stored messages addressed to the user of the mobile telephone device.

Preferably, the messages addressed to the user are forwarded towards the server associated with that computer program product following a positive response made by that server to an interrogation initiated by the Internet-based application, in order to determine whether the user's identification is stored at the server associated with that computer program product, or in other words, to establish at which server has the user been registered with that Internet-based application.

According to another embodiment, the computer program product is further adapted to carry out an authentication procedure of the user.

By yet another embodiment, the virtual client entity is constructed to match at least one protocol used by the Internet-based application and at least one protocol by which the mobile telephone device is adapted to communicate. Preferably, the at least one protocol used by the Internet-based application is different from the at least one protocol by which the mobile telephone device is adapted to communicate.

According to yet another embodiment of the invention, there is provided a computer program product encoding a computer program for executing on a computer system a process for receiving one or more messages transmitted to a user of a mobile telephone device via an Internet-based application associated with a remote server while said mobile telephone user is not actively connected to the Internet-based application, enabling storage of messages received and providing the user with an indication that the messages have been stored.

BRIEF DESCRIPTION OF THE DRAWINGS

FIG. 4 demonstrates a method according to an embodiment of the invention by which a user communicates with an Internet-based application, while FIG. 5 exemplifies a method by which the user is notified of messages received at times when he/she was not connected to the respective Internet-based application.

DETAILED DESCRIPTION OF THE INVENTION

A better understanding of the present invention is obtained when the following non-limiting detailed description is considered in conjunction with the following drawings.

Figure 1:
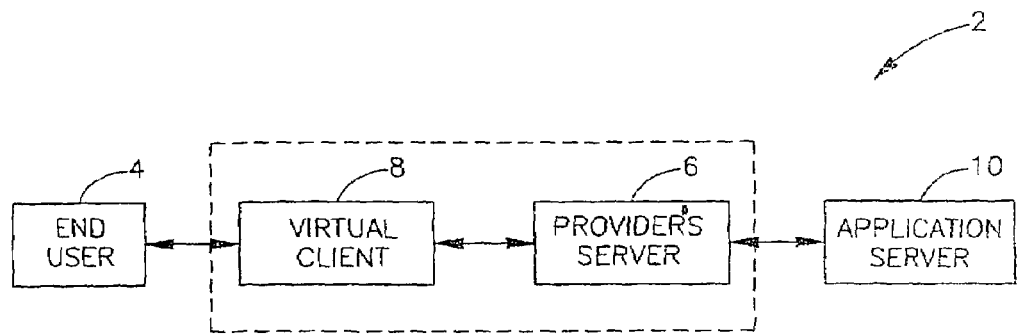
FIGS. 1 to 3—present block diagrams of systems construed in accordance with different embodiments of the present invention.

Let us consider now FIG. 1 which is a schematic block diagram of a system 2 according to an embodiment of the present invention. The system shown comprises and user 4 who wishes to conduct through his/her telephone device a session while using a certain application such as ICQ®, AIM®, MSN® etc. The end user communicates with the provider's server (e.g. Tjat™ server) which is shown in this FIG. for illustration purposes only as being comprised of two entities, server 6 and virtual client 8. In reality such a server comprises some or all of the following functions: web application, web server, database. Java® engine and Tjat application, which is operative to provide the connectivity between the user and the provider of the requested application.

At its other end, the provider's server is connected to the appropriate application server, 10. It should be noted that one of the advantages of the solution provided by the present invention is, that there is no need for the telephone device to be configured in any way to communicate with the virtual client entity, because the provider's server which receives the request is able to recognize the resources available for the telephone device making the request on the one hand, and the requirements set for communicating with the requested application's server, so that the virtual client which is constructed by the provider's server is constructed in a way that takes into account these various constrains.

Figure 2:
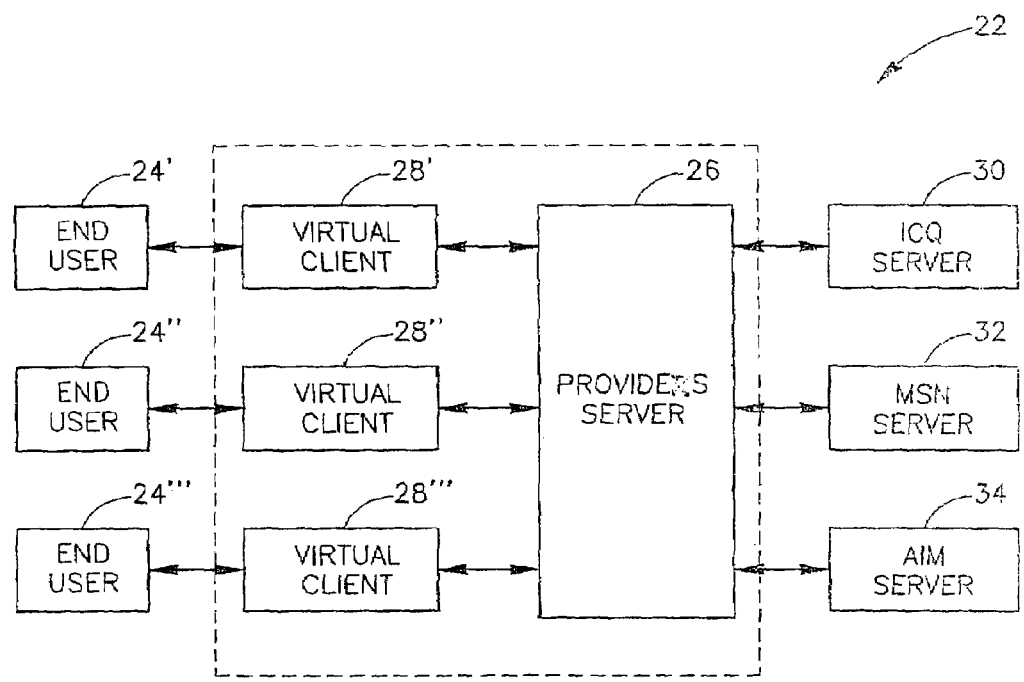

FIG. 2 shows another example of a system 22 in accordance with an embodiment of the present invention. By this example each of the three end users 24', 24" and 24"' communicate with the provider's server 26, requesting the use of a different application. User 24' wishes to use the ICQ® application that resides at ICQ server 30, user 24" the MSN® application that resides at MSN server 32 and user 24"'—the AIM® application that resides at AIM server 34. In server 26, three corresponding virtual clients are constructed, 28', 28" and 28"', respectively. Each of these virtual clients' entities is constructed in a way that it can communicate with the requested application's server. For example, the language used to communicate with the application server by one of these virtual clients can be Java™ while the virtual client constructed to meet the request of communicating with a different application can use a different language such as BREW (Binary Runtime Environment for Wireless), Visual C#®, or any other language applicable to mobile telephone devices.

Figure 3:
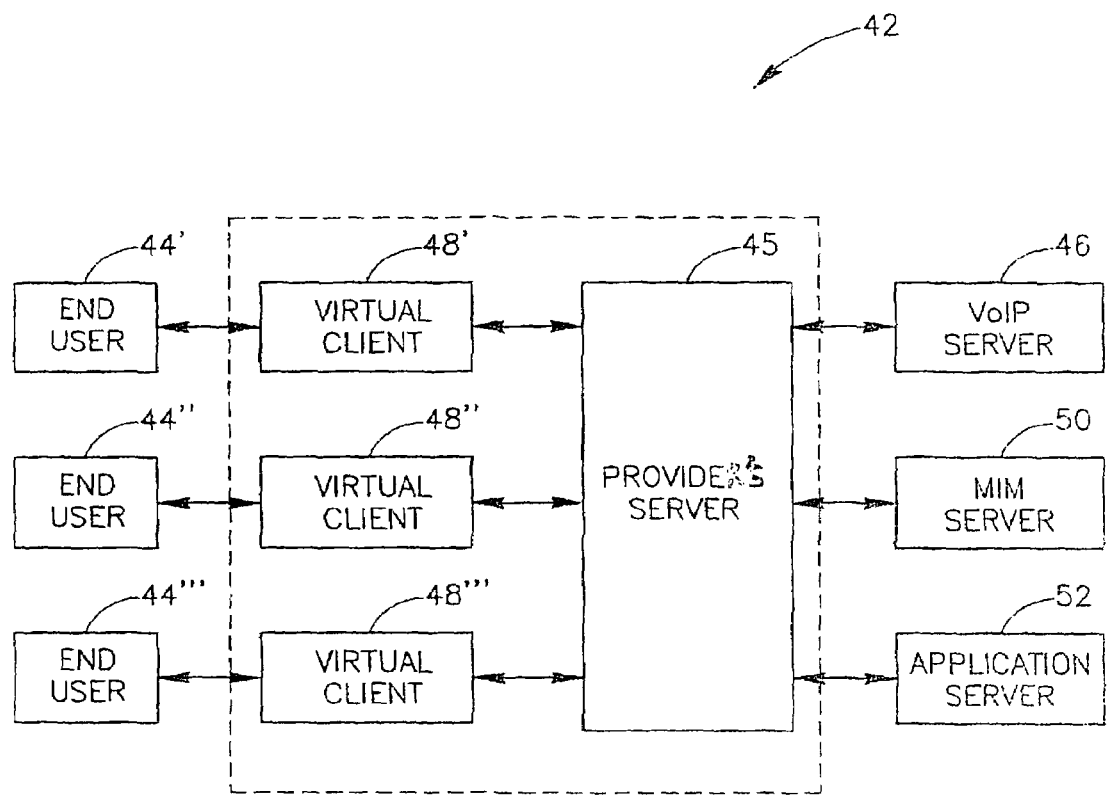

FIG. 3 presents yet another schematic illustration of an embodiment of system 42 construed according to the present invention. In this FIG., three telephone users, 44', 44" and 44"' are in communication with provider's server 45. However, by this example only one of the users, 44"', requests to communication with the application server 52, while the others is engaged with a •Voice over Internet Protocol (VoIP) call (user 44') and user 44" to MIM (Mobile Instant Messaging). Server 45 with which all the users communicate, is capable of differentiating between the various requirement, so that after constructing the appropriate virtual client entities (48', 48" and 48"', respectively), directs the communications to the appropriate addresses. This way, the VoIP session held with user 44' is routed via VoIP server 46, the session with user 44" via MIM server 50, while the session with user 44"' is directed to application server 52.

Figure 4:
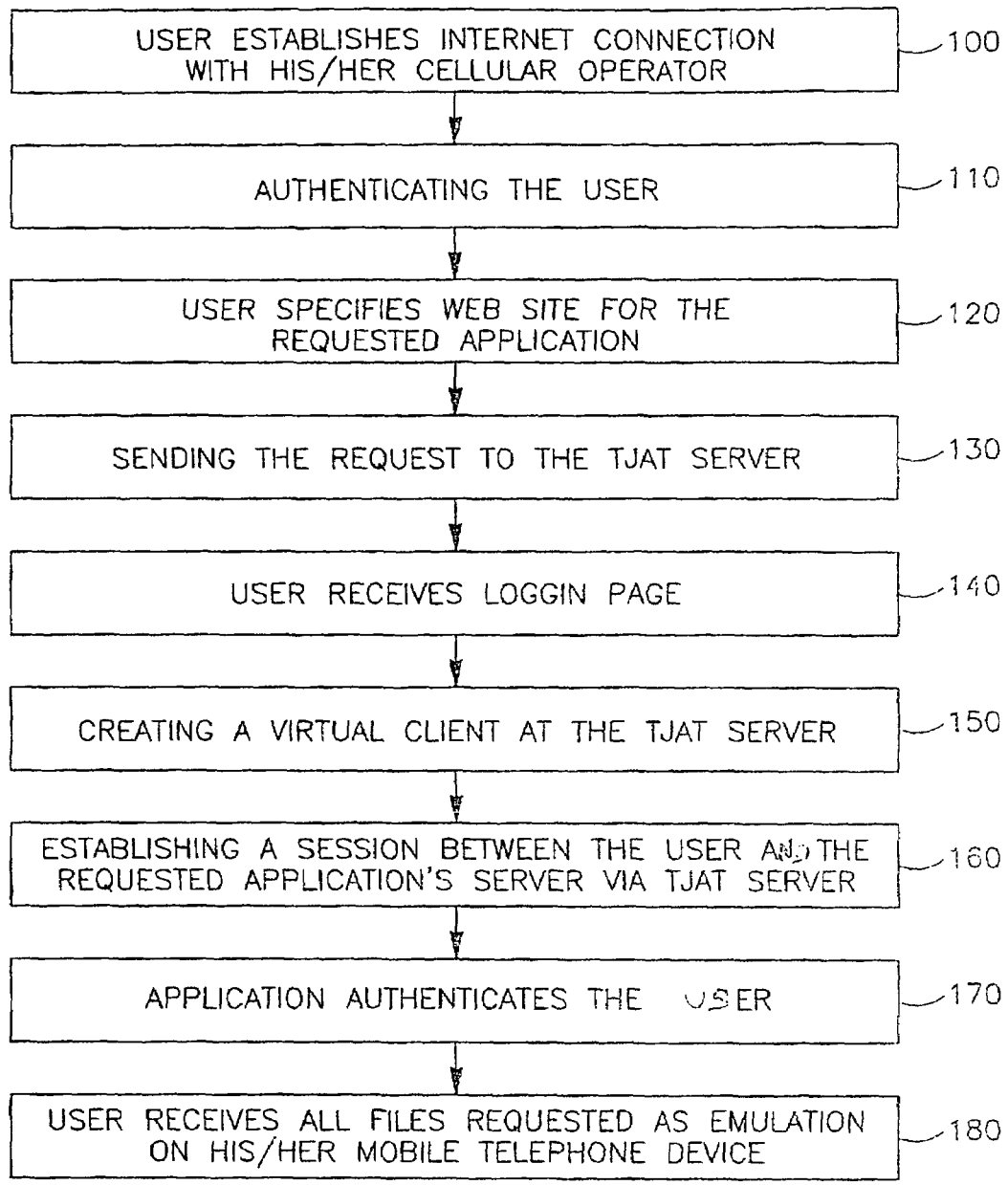
FIGS. 4 and 5—demonstrate an example of carrying out the method according to an embodiment of the present invention.

FIG. 4 presents a flow chart of an example demonstrating the method by which the user communicates with an Internet-based application, MSN®. The user opens the browser at his/her cellular device and establishes Internet connection such as General packet radio service (GPRS)/3 G (or any other method supported by his/her current cellular operator) in order to conduct a communication session (step 100). Once the connection has been established, the cellular operator will authenticate the user (step 110) by applying any method known in the art per se for authenticating a mobile user in order to provide Internet connectivity and billing the user.

Next, the user specifies a web site (step 120), using his/her cellular telephone, e.g. the page wap.tjat.com. Once this page is loaded, the user receives a menu from which he/she should choose the application to use (e.g. MSN®). This request is then sent (step 130) to wap.tjat.com server, and the user receives in response a login page (step 140). At this stage, a virtual client (a "terminal service" like) is created (step 150) for the user by creating a phase Java™ emulation thread between tjat server and the telephone user (the end user). This path will remain active until the user logs off. Preferably, the user receives all the pages transmitted in the applicable format from the tjat server, which will serve that end user as his/her "Application interface" (e.g. the "terminal service" based on that "Java™ emulation" thread) so that no software shall be required to be installed for the telephone device. Now, the tjat system has established the tunnel based on pre-defined icq.com protocol where the tunnel extends between the server operative under the address icq.com to the server operative under the address tjat.com, and thereafter between the server tjat.com and the telephone user. Once the telephone user receives the login page, he/she may navigate with the aid of the telephone keys in order to select the requested application (i.e. the requested link). Upon selecting the requested link, the telephone device shall transmit a WML (wireless markup language) message with the selected application to the virtual client, which translates the information into a command in the language that is suitable to communicate with the tjat.com server (e.g. Java™). Since the tjat.com server is the entity responsible to create the virtual client, there is no need to pre-defined a language for the operation of the virtual client. Following the above steps, the server opens a communication channel with the application server. In the case that the telephone's operating system is capable of translating the characters types by the user on his/her phone into symbols, the symbols will be communicated to the tjat.com server, otherwise, when the session is created, the characters will be transmitted to the tjat.com server, the telephone device will receive a WML page and the link can be selected therefrom.

On the login page (step 140), the user may now enter his/her user information associated with the application chosen, e.g. MSN® user ID and password. For a first time user, a user ID and password will be selected during that first session, and the user ID will be stored at the tjat server.

Upon clicking on "connect", a new session is created (step 160) for that specific user between the tjat.com server and the msn.com server. The information provided by the user is then transferred to msn.com server in order for the MSN® provider to authenticate the user, by running an AUTH query with icq.com validation servers (step 170). Once the user has been authenticated, he/she may login. Following the logging in of the user, he/she will receive all the files transmitted in the applicable format, depending on the end user requests, like "Contact list", "History", "User info" and/or any other page requested by the user. All these files will be received by the user as emulation, and not locally (application) on the mobile device (step 180).

During the period at which the user is in communication with wap.tjat.com he/she may be engaged in a variety of activities, such as sending/receiving messages, retrieving history files associated with other users included in his/her contact list, receiving information related to other users, adding/removing contacts, changing connection status, changing settings (e.g. encoding, certain interface features, not including the settings which are stored at the tjat.com associated database, and the like.

Figure 5:
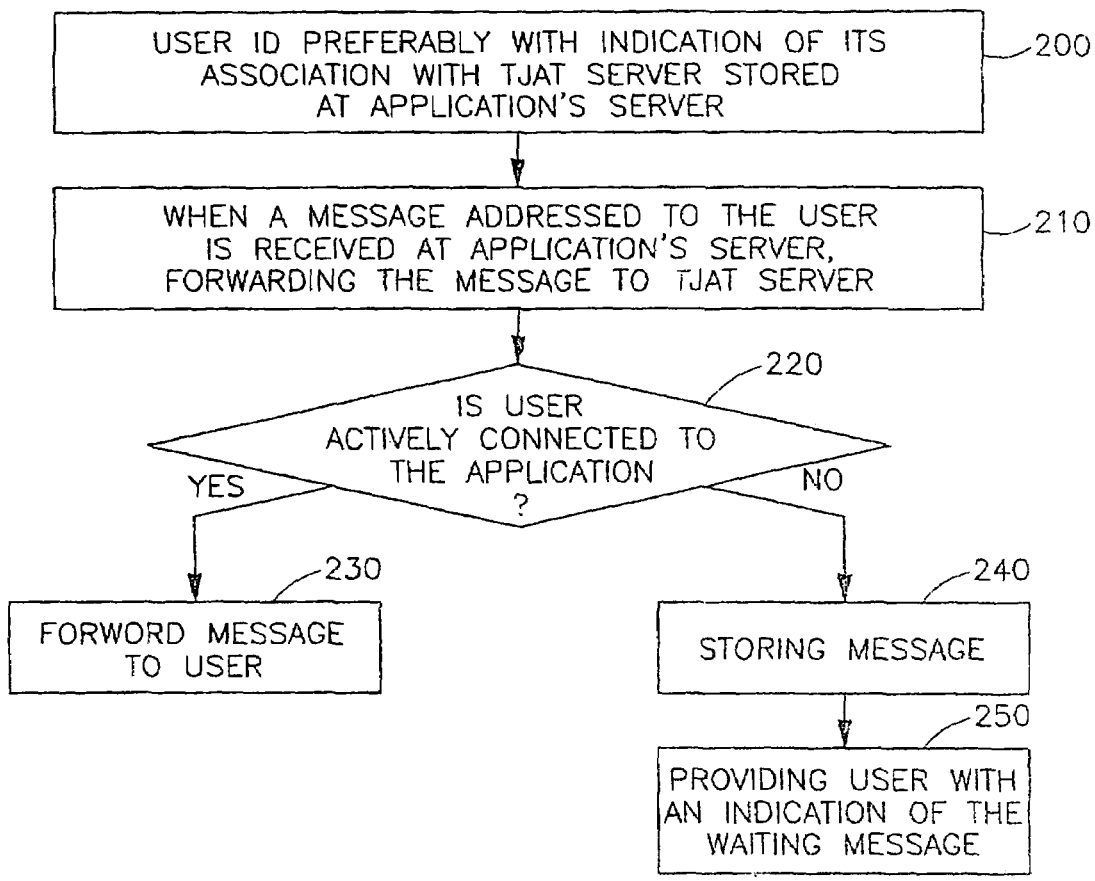

FIG. 5 presents a flow chart of another example demonstrating the present invention. In this example, a cellular telephone user wishes to be connected to the MSN® application and receive messages including at times when he/she is off-line (i.e. not actively connected to the MSN® application). According to this example the user has to be registered with the MSN® application via the tjat server, and the establishment of that first communication session may be carried as described for example in FIG. 4.

When the user subscribes to the internet-based application, e.g. the MSN® service, his/her user ID for that application is stored at the application's server (step 200). When a message received at the application server and destined to the user, it shall be forwarded (step 210) towards the tjat server. At the tjat server it is determined whether the user is currently connected to that Internet-based application (step 220), if it is determined that the user is indeed currently connected to the application server, the message will be forwarded to the user (step 230), otherwise, the message is stored at the tjat server (240). Next, the user is provided with an indication (step 250) that one or more messages are awaiting him/her. The indication preferably also includes an identification of the application through which that the message has been received.

There are a number of ways to carry out this step 250, all of which should be understood to be encompassed by the present invention. It may be carried out following the receipt of the user's request to be connected to that Internet-based application at any time after the message has been stored at the tjat server. Alternatively, the indication is provided to the user following the establishment of a communication session between the user and the Internet-based application at any time after the message has been stored at the first server. By yet another alternative, the indication is sent to the user's telephone device once storage of the message at the tjat server has been successfully completed, irrespective if the user has initiated a request to be connected that Internet-based application, or not, so that the user may receive the indication while being for example in a telephone mode (as opposed to being in communication with an Internet-based application).

As will be appreciated by those skilled in the art, the examples provided illustrate some ways of establishing a communication tunnel between the telephone user and the application server, via an intermediate server and a virtual client application operative at that server. However, similar methods may be used to open and maintain that tunnel, without departing from the scope of the present invention.

It is to be understood that the above description only includes some embodiments of the invention and serves for its illustration. Numerous other ways of carrying out the methods provided by the present invention may be devised by a person skilled in the art without departing from the scope of the invention, and are thus encompassed by the present invention.

The invention claimed is:

1. A method to allow providing a user of a mobile telephone device with an indication that a message was sent to him/her by a sender via an internet-based application, irrespective of whether said user is currently actively connected to said Internet-based application, which method comprises the steps of:

at a server, receiving said message that was sent to said user via said active internet-based application selected by the sender from among a plurality of available internet-based applications which are located at a location other than said mobile telephone device, said message received for forwarding towards said user;

determining whether a virtual client entity specific to said user's mobile telephone device had been created at said server, said virtual client entity being aware of resources associated with said mobile telephone device so that no configuration of the mobile telephone device is required for communicating with said virtual client entity, and said virtual client entity translating information received from the user into commands in a format that is suitable to communicate with said selected Internet-based application, and if in the affirmative, determining whether said user is currently actively connected to the selected Internet-based application;

automatically storing the message if said user is not currently actively connected to said selected Internet-based application;

providing by said virtual client entity, an indication that at least one message addressed to him/her has been stored that may be retrieved wherein said indication is provided even when said mobile telephone device is used by said user in a mode other than being in communication with an Internet-based application and enabling retrieval of said at least one message, wherein each of said at least one message is conveyed towards said user after having confirmed that it is in conformity with the resources associated with said mobile telephone device.

2. The method according to claim 1, further comprising carrying out the following steps when said user that had never been registered to said Internet-based application, wishes to register thereto:

transmitting a message to said server by said mobile telephone device, denoting the user's request to be connected to said Internet-based application;

establishing a communication path extending between said mobile telephone device and said Internet-based application via said server;

at said server, creating said virtual client entity configured to communicate with said mobile telephone device and with said Internet-based application;

associating a user ID and a password representing said user with said virtual client entity in order to allow him/her to use said Internet-based application in the future; and storing an identification of said user at a database associated with said server.

3. The method according to claim 2, further comprising a step of authenticating the user by a service provider associated with said server.

4. The method according to claim 2, further comprising a step of providing said user with a menu from which the user selects a requested application prior to carrying out the step of establishing said communication path.

5. The method according to claim 2, further comprising a step of providing said mobile telephone device with a plurality of WML/JSP/HTML pages transmitted from said server.

6. The method according to claim 1, further comprising providing said mobile telephone device with an emulation to allow the user to communicate with said Internet-based application, when a communication session takes place.

7. The method according to claim 1, further comprising a step of establishing an Internet connection between said mobile telephone device and said server prior to transmitting said indication.

8. The method according to claim 1, wherein said step of providing the user with said indication is carried out following receipt of a request generated at said mobile telephone device, to connect its user with any Internet-based application via said server.

9. The method according to claim 1, wherein said step of providing the user with said indication is carried out following the establishment of a communication session between said mobile telephone device and said Internet-based application.

10. The method according to claim 1, wherein said step of providing the user with said indication is carried out by sending said indication to the mobile telephone device following storage of the message at said server, irrespective of whether a request to connect said user with said Internet-based application has already been initiated.

11. A computer program product configured to be stored on a non-transitory computer readable medium and executed by a computer system comprising one or more computer processors providing a user of a mobile telephone device with an indication that a message was sent to him/her by a sender via an internet-based application, said computer program product comprising instructions for:

receiving said message that was sent to said user via said active internet-based application selected by the sender from among a plurality of available internet-based applications which are located at a location other than said mobile telephone device, said message received for forwarding towards said user;

determining whether a virtual client entity specific to said user's mobile telephone device had been created at one of said processors, said virtual client entity being aware of resources associated with said mobile telephone device so that no configuration of the mobile telephone device is required for communicating with said virtual client entity, and said virtual client entity translating information received from the user into commands in a format that is suitable to communicate with said selected Internet-based application, and if in the affirmative, determining whether said user is currently actively connected to the selected Internet-based application;

storing an indication of a user of said mobile telephone device for communicating with said Internet-based application, automatically storing at least one message forwarded to a server associated with said computer program product by the Internet-based application that has been used for sending the message, if the user of the mobile telephone device is not actively connected to said Internet-based application, sending an indication generated by said virtual client entity towards said mobile telephone device that there is/are stored messages addressed to the user of said mobile telephone device that may be retrieved even when said mobile telephone device is used by said user in a mode other than being in communication with an Internet-based application; and enabling retrieval of said at least one message, after having confirmed that it is in conformity with the resources associated with said mobile telephone device.

12. The computer program product according to claim 11, wherein messages addressed to said user are forwarded towards said server associated with said computer program product following a positive response made by said server to an interrogation initiated by said Internet-based application to determine whether said user's identification is stored at said server associated with said computer program product.

13. The computer program product according to claim 11, further adapted to carry out an authentication procedure of the user.

14. The computer program product according to claim 11, wherein said virtual client entity is constructed to match at least one protocol used by the Internet-based application and at least one protocol by which the mobile telephone device is configured to communicate.

15. The computer program product according to claim 11, wherein said at least one protocol used by said internet-based application is different from said at least one protocol by which the mobile telephone device is configured to communicate.

16. A method to allow providing a plurality of users of mobile telephone devices with indications that a message was sent to each of said plurality of users by each of a plurality of senders via an Internet-based application, which method comprises the steps of:

at a server, receiving said message addressed to a user from among the plurality of users of mobile telephone devices via said active internet-based application selected by each of the plurality of senders from among a plurality of available internet-based applications which are located at a location other than said user's mobile telephone device, said message received for forwarding towards said user;

determining whether a virtual client entity specific to said user's mobile telephone device had been created at said server, said virtual client entity being aware of resources associated with said mobile telephone device so that no configuration of the mobile telephone device is required for communicating with said virtual client entity, and said virtual client entity translating information received from the user into commands in a format that is suitable to communicate with said selected Internet-based application and if in the affirmative, determining whether said user is currently actively connected to the selected Internet-based application;

automatically storing the message if said user is not currently actively connected to said selected Internet-based application;

generating by said virtual client entity, an indication that at least one message addressed to said user has been stored that may be retrieved wherein said indication is provided, even when said mobile telephone device is used by said user in a mode other than being in communication with an Internet-based application; and enabling retrieval of said at least one message, wherein each of said at least one message is conveyed towards said user after having confirmed that it is in conformity with the resources associated with said mobile telephone device.

* * * * *